Nov. 21, 1967 SHINTARO OSHIMA 3,354,447

THIN FILM TAPE RECORDER

Filed Dec. 4, 1964 7 Sheets-Sheet 1

Nov. 21, 1967 SHINTARO OSHIMA 3,354,447

THIN FILM TAPE RECORDER

Filed Dec. 4, 1964 7 Sheets-Sheet 3

Nov. 21, 1967 SHINTARO OSHIMA 3,354,447

THIN FILM TAPE RECORDER

Filed Dec. 4, 1964 7 Sheets-Sheet 4

Nov. 21, 1967 SHINTARO OSHIMA 3,354,447

THIN FILM TAPE RECORDER

Filed Dec. 4, 1964 7 Sheets-Sheet 6

Nov. 21, 1967 SHINTARO OSHIMA 3,354,447

THIN FILM TAPE RECORDER

Filed Dec. 4, 1964 7 Sheets-Sheet 7

United States Patent Office 3,354,447

Patented Nov. 21, 1967

3,354,447

THIN FILM TAPE RECORDER

Shintaro Oshima, 426 2-chome, Higashi-machi, Kichijoji, Musashino-shi, Japan

Filed Dec. 4, 1964, Ser. No. 415,971
Claims priority, application Japan, Dec. 9, 1963, 38/65,922
22 Claims. (Cl. 340—174.1)

This invention relates generally to magnetic recording systems and more particularly to magnetic recording systems using memory means consisting of a slender conductor coated with ferromagnetic thin film.

In conventional recording systems, magnetic tapes, such as paper tapes or plastic tapes, on which fine particles of magnetic substance are caused to adhere are generally used as memory means. In another known recording system, small magnetic solid wires are used as memory means. In order to improve the regeneration characteristic at relatively high frequency, it is necessary to make the thickness of adhering fine particle layer of magnetic substance thin and uniform, but this is very difficult because of the possibility of the thin particle layer of magnetic substance becoming non-uniform during the adhesion process thereof. With reference to another memory means of small magnetic wire, it is necessary to make the diameter of the magnetic wire very small in order to improve the regeneration characteristic at such relatively high frequency. As a result of using such a very small diameter of the magnetic wire, however, there are some disadvantages, that is, decrease in the regeneration output due to reduction of the remnant magnetic fluxes and, possibility of cutting the wires, and inconvenience in handling the magnetic wires. Accordingly, such magnetic solid wires have rarely been used in conventional magnetic recording systems.

It is an object of the invention to provide magnetic recording systems having substantially an uniform regeneration characteristic up to a relatively high frequency.

Another object of the invention is the provision of magnetic recording systems capable of recording continuously for a long time.

A further object of the invention is the provision of magnetic recording systems capable of performing a recording operation with very weak information signals to the memory means which has a relatively large coercive force as described in detail below.

The object of the invention can be attained by the magnetic recording system of the invention, comprising memory means consisting of a slender magnetic material, an erasing means for erasing the effect of remnant magnetization of the slender material before memory operation, an information applying means for magnetizing the slender material in accordance with the magnitude of an information signal which is less than the magnitude to generate a magnetomotive force equal to the coercive force of the magnetic material, an exciting means for applying an auxiliary magnetization to the slender magnetic material, the magnetizations caused by the information applying means and the exciting means being superimposed at an extremely short portion of the slender material, and means for moving the slender material in its longitudinal direction at a substantially constant travelling speed, thereby shifting the superimposed magnetization along the longitudinal direction of the slender magnetic material, whereby the information signal is memorized in the remnant state of the magnetic material in accordance with the shifting of the superimposed magnetizations, and then the information signal so memorized is non-destructively derived from the slender magnetic material when the exciting means applies an appropriate magnetic field to the slender material in the operation of said means for moving the slender memory means. The recording system is characterized in that the slender magnetic material is composed of a slender conductor coated with ferromagnetic thin film having anisotropy, in that the information applying means magnetizes the slender material in the direction of the anisotropy, the exciting means magnetizes the slender magnetic material in the direction orthogonal to the direction of the anisotropy, thereby reducing the magnitude of the coercive force of the ferromagnetic thin film viewed from the direction of the anisotropy, and in that the information applying means further applies a bias field to the slender material in the direction of the anisotropy so as not to substantially vary the remnant magnetization of the magnetic material with respect to an original point of the hysteresis curve.

The foregoing and other objects, the advantages and novel features of this invention, as well as the invention itself both as to its organization and mode of operation, may be best understood from the following detailed description when read together with the accompanying drawing in which like reference numerals refer to like parts, and in which:

FIGS. 1(A) and 1(B) are perspective views of memory means to be employed in the recording system of the invention;

FIG. 2 is a diagram of a hysteresis characteristic curve for describing a feature of the invention;

FIGS. 3(A) and 3(B) are pattern diagrams for explaining the principle of the invention;

Figure 14:
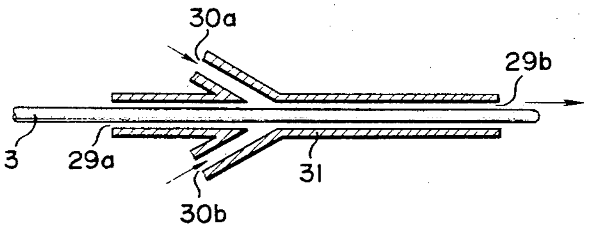
Figure 13A:
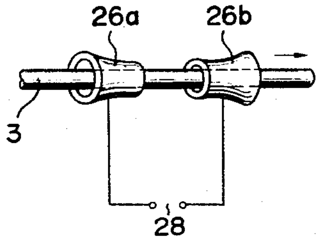
Figure 13B:
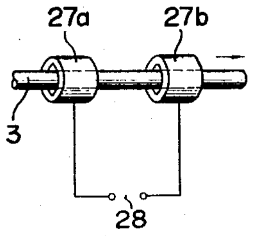

FIGS. 11(A), 11(B), 12(A) and 12(B) are respectively elevational, sectional, perspective, and sectional views of examples of the magnetic head of the invention shown;

FIGS. 13(A) and 13(B) are respectively perspective views of examples of a pair of terminals which are capacitively coupled to the memory means according to the invention; and FIG. 14 a diagrammatic sectional view showing an embodiment of the moving means according to the invention.

It should be understood, of course, that the drawings are presented for the purpose of exemplification without limiting the invention or the appended claims.

Figure 1A:
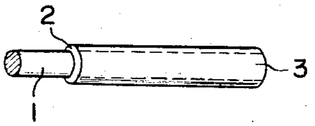
Figure 1B:
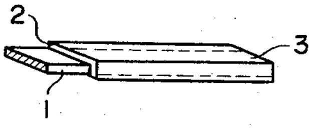

Referring now to FIGS. 1(A) and 1(B), which illustrate forms of memory means 3 of this invention, there are shown a conductive wire 1*a* and a ribbon conductor 1*b* (these are referred to as a slender conductor 1 hereinafter) and a ferromagnetic thin film 2 applied as a coating on the slender conductor 1. The slender conductor 1 is of electrically highly conductive material, such as copper. A spring wire, such as wire of copper, Phosphor bronze or beryllium copper, is desirable for use as the slender conductor 1 in order to remove undesirable effects of strains caused by any external force. The ferromagnetic thin film 2 is composed of ferromagnetic substances, such as Permalloys, and is applied on the slender conductor 1 by electric or chemical plating or vacuum evaporative deposition. The memory means 3 is manufactured by a process similar to that for a conventional clad wire. Since the slender conductor 1 is liable to be strained by external forces in handling the wire, it is desirable that the ferromagnetic thin film 2 have a non-magnetostriction characteristic.

Figure 2:
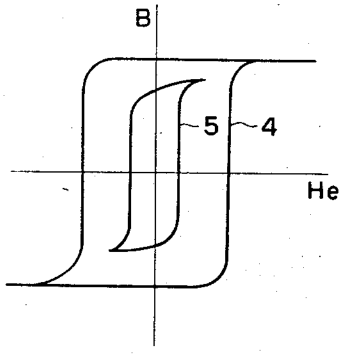
Figure 3A:
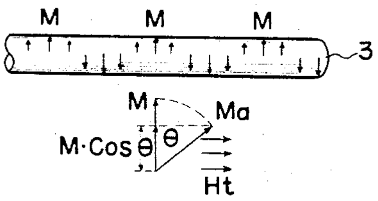
Figure 3B:
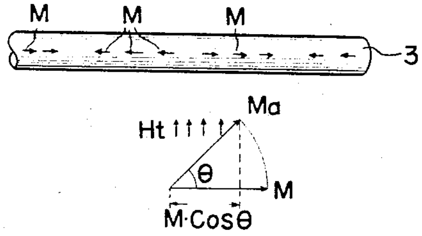
Figures 4, 5:
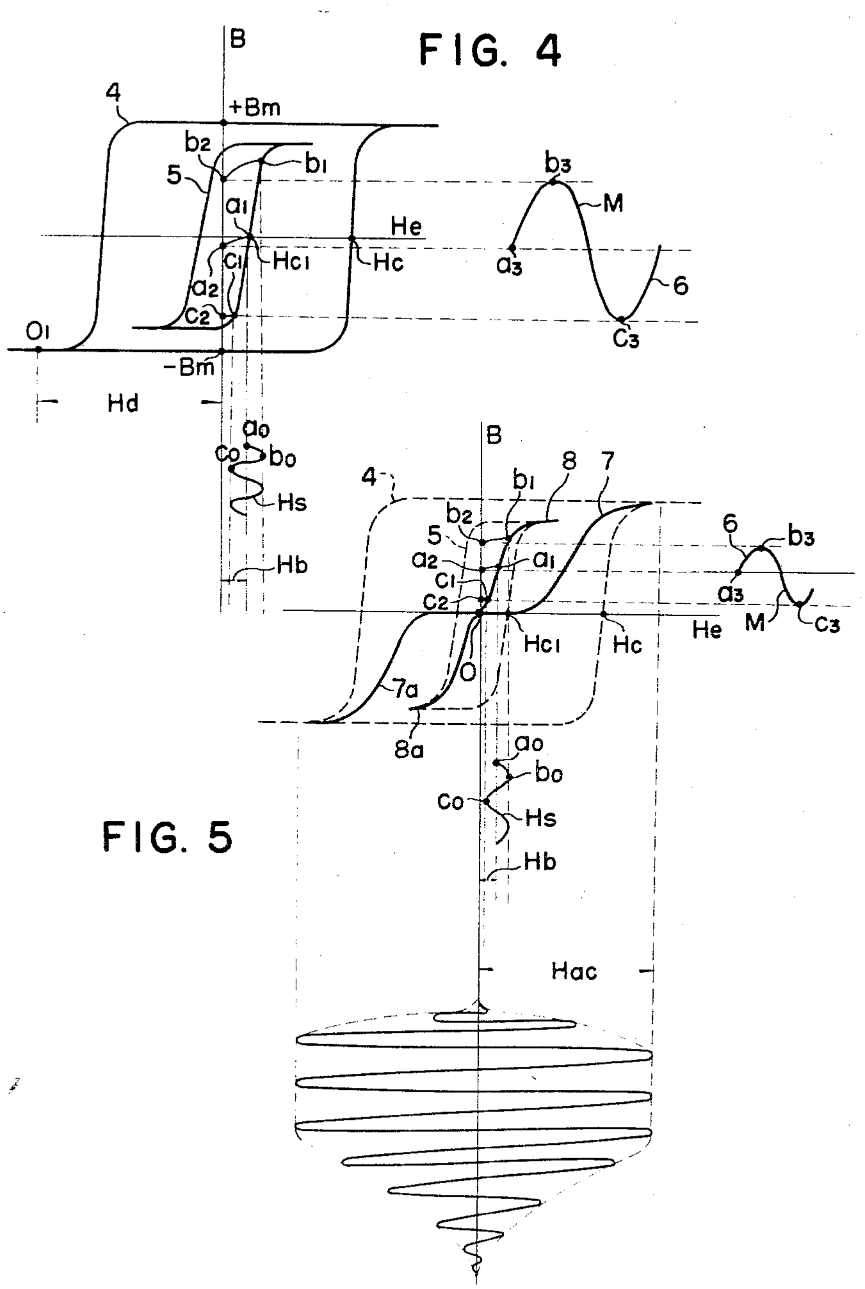
FIGS. 4 through 8 are characteristic curves and waveform diagrams for explaining the principle of the invention.

Referring to FIGS. 4 through the 8, generic operational principles of the recording system according to this invention will now be described in detail. With reference to the anisotropy (easy axis) of the magnetic thin film, there are two modes, that is, a longitudinal mode and a transverse mode. The hysteresis characteristic of the magnetic thin film viewed from the easy axis is generally shown as a curve 4 in FIG. 2, where the abscissa $H_e$ represents the strength of a magnetic field applied in the direction of the easy axis. In this case, if an auxiliary magnetic field $H_t$ is applied to the magnetic thin film in the direction (hard direction) orthogonal to the easy axis, the hysteresis characteristic curve 4 will be reduced to a curve 5 corresponding to an intensity of the auxiliary magnetic field $H_t$. Moreover, if an information magnetic field $H_e$ is applied to the magnetic thin film under the application of the auxiliary magnetic field $H_t$, the magnitude of the remnant magnetization will be proportional to the intensity of the information magnetic field $H_e$ in an appropriate range of the field $H_e$. In order to apply the information magnetic field $H_e$ in the appropriate range, it is necessary to employ a bias magnetic field $H_b$ applied in the direction of the easy axis. Such recording operations will be described in detail below with respect to each of the operation modes. FIGS. 3(A) and 3(B) illustrate patterns of remnant magnetizations, where (A) and (B) correspond respectively to the transverse mode and the longitudinal mode. In these patterns, the memory means are the same as memory means 3, and variations of magnitudes of the remnant magnetization M show that the information signal is proportionally recorded, similarly as in conventional recording systems, according to the longitudinal travelling of the memory means 3. In the case of reproduction of the information signal memorized, the auxiliary magnetic field $H_t$ is applied to the memory means, whereby the magnetization M is rotated, by an angle $\theta$, under the effect of the field $H_t$ so that an easy directional component of the magnetization M is reduced to a magnitude $M\cdot\cos\theta$. Accordingly, the voltage $e$ derived from the memory means 3 in accordance with the reduction of the easy directional component of the magnetization M is represented by the following equation:

$$e=K\frac{M-M\cdot\cos\theta}{\Delta_t}=K\cdot M\frac{(1-\cos\theta)}{\Delta_t} \quad (1)$$

where K is a constant coefficient, and differential $\Delta_t$ is the time necessary for the rotation of the magnetization M from M to M$a$. As is apparent from Equation 1, the regeneration output voltage $e$ is proportional to the remnant magnetization M. For the intensity of the auxiliary magnetic field $H_t$, it is necessary to take a value less than that to rotate the magnetization M to the hard direction of the magnetic material so that a non-destructive sensing operation can be carried out. The above disclosure relates to the general operation of the recording systems of the invention. Detailed description for respective modes are as follows—

(1) As to the case in which both of the erasing means and the bias means are operated so as to apply direct magnetic fields (FIG. 4):

First, an erasing direct-current magnetic field $H_d$ is applied to the memory means 3 with minus polarity so that the memory means is magnetized to a point $O_1$. When the erasing field $H_d$ is eliminated, the magnetization is restored from the point $O_1$ to a point $(-B_m)$. Then an information magnetic field $H_s$ and a bias magnetic field $H_b$ are simultaneously applied. The intensity of the superposed field relative to the fields $H_s$ and $H_b$ is selected so that it is less than the coercive force $H_c$ of the original hysteresis characteristic; therefore, the magnitude of the magnetization $(-B_m)$ is not varied only with the superposed field. However, when the auxiliary magnetic field $H_t$ is applied in the hard direction of the memory means, the original hysteresis characteristic curve 4 is reduced to the curve 5. Accordingly, the information magnetic field $H_s$ together with the bias field $H_b$ magnetizes the memory means 3 as shown in FIG. 4, in which points $a_0$, $b_0$ and $c_0$ on the information field curve $H_s$ respectively correspond to points $a_1$, $b_1$ and $c_1$ on the reduced hysteresis curve 5. Then magnetizations representative of the points $a_1$, $b_1$ and $c_1$ are respectively restored to points $a_2$, $b_2$ and $c_2$ when the applied fields are eliminated. In an actual case, application of the information magnetic field $H_e$ is carried out in accompaniment with the longitudinal travelling of the memory means 3. As a result of such operation, the information signal is recorded in the memory means 3 in the state of remnant magnetization M shown by a curve 6, on which points $a_3$, $b_3$ and $c_3$ correspond respectively to the points $a_2$, $b_2$ and $c_2$. In the case of read out of the memorized information, an appropriate auxiliary magnetic field $H_{t1}$ substantially equal to or less than the magnetic field $H_t$ is applied to the memory means 3 in order to carry out a non-destructive sensing therefor. The output signal is proportional to the remnant magnetization M as described with reference to Equation 1. When an alternating magnetic field is employed as the magnetic field $H_{t1}$, an output signal having the alternating component of the field $H_{t1}$ and modulated with the memorized information can be read out. The two fields $H_t$ and $H_{t1}$ may be used simultaneously.

(2) As to the case in which the erasing means and the bias means are operated so as to apply, respectively, direct and alternating magnetic fields (FIG. 5):

An erasing alternating magnetic field $H_{ac}$ is first applied to the memory means 3, the intensity of the erasing field $H_{ac}$ being enough to magnetize the memory means 3 along the major hysteresis curve 4. This erasing operation causes restoration of the magnetization of the memory means 3 to the original point O according to an operation similar to that of the conventional magnetic tape recording system using a high-frequency bias method. When an information field $H_e$ and a bias field $H_b$ are applied, but an auxiliary field $H_t$ is not applied, the magnetization M is not varied because the memory means 3 is magnetized along an initial magnetization curve 7 of the original hysteresis curve 4. When the auxiliary field $H_t$ is applied, then the memory means 3 is magnetized along an initial magnetization curve 8 of the reduced hysteresis curve 5 so that a remnant magnetization M proportional to the information is obtained. The read out operation for the remnant magnetization M is similar to that in the case (1) set forth above.

Figure 6:
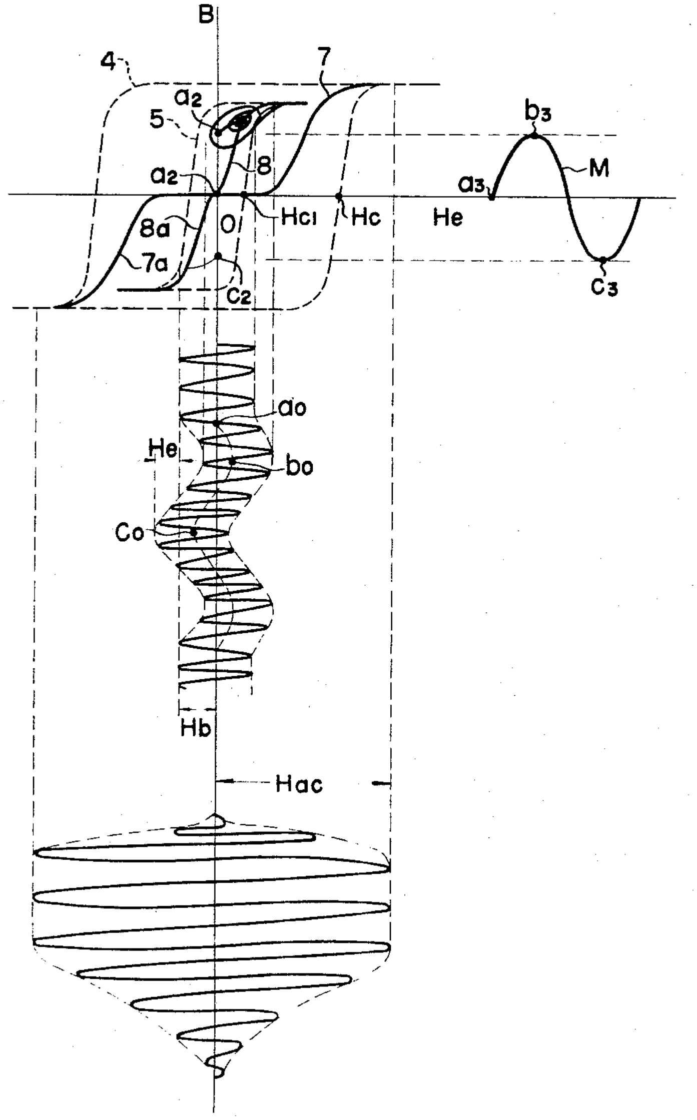

(3) As to the case in which both of the erasing means and the bias means are operated so as to apply alternating bias fields (FIG. 6):

The erasing operation of this case is the same as that in the case (2) set forth above. The intensity of the bias field may be reset with some allowance therefor in a considerably wide range so as to symmetrically magnetize the memory means 3 with respect to the original point O. In other words, the remnant magnetization M is not varied only by the bias magnetic field. Suitable intensity of the bias field $H_b$ is more than the coercive force $H_{c1}$ of the reduced hysteresis curve 5 and is of a value sufficient to magnetize the memory means 3 along the major hysteresis curve 5. In this case, the bias field $H_b$ can be employed as the erasing magneic field $H_{ac}$ so that a different magnetic field for the erasing operation may be omitted. By the application of the auxiliary magnetic field $H_t$ and the information magnetic field $H_e$, the memory means 3 is asymmetrically magnetized with respect to the original point O, so that the remnant magnetization M is obtained proportionally to the information. The read out operation is similar to that in the case (1) described above.

(4) As to the case in which the erasing means is operated so as to apply an alternating bias field, and the magnitude of the bias field is zero (FIG. 7):

The erasing operation in this case is the same as that in the above cases (2) and (3). In the case of a recording operation of this mode, the bias magnetic field takes a zero value, but the information field $H_5$ magnetizes the memory means 3 along the initial magnetization curves 8 and 8$a$ so that a remnant magnetization M substantially proportional to the information field $H_s$ is obtained except for a very weak information signal.

Figures 7, 8:
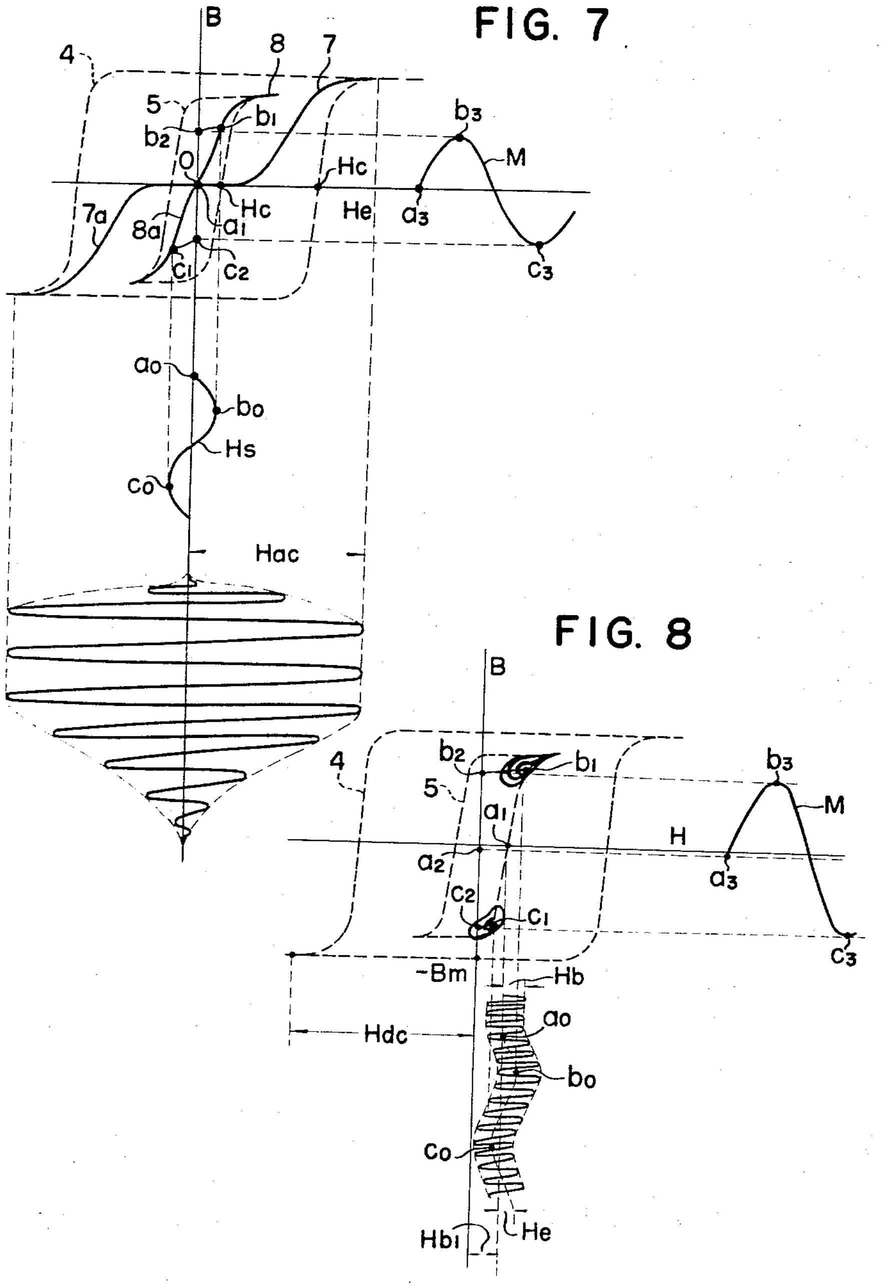

(5) As to the case in which the erasing means applies the direct-current field $H_{dc}$, and the bias means applies a superposed field of a direct-current field and an alternating field (FIG. 8):

An erasing direct-current magnetic field $H_d$ is applied to the memory means in the same manner as in the case (1), so that the remnant magnetization M is restored to a point ($-Bm$). Then a superimposed field of a direct-current field $H_{b1}$ and an alternating field $H_{b2}$ is applied to the memory means 3. The magnetization M is not varied by the application of only the superimposed field, but when an auxiliary magnetic field $H_t$ is applied, the magnetization M is varied as shown in FIG. 8 in accordance with the information field $H_e$. The intensity of the direct-current bias field $H_{b1}$ is substantially equal to the coercive force of the reduced hysteresis characteristic curve 4. The read out operation in this case is similar to that in the above described cases.

As described above, in the recording system of this invention, the effect of a remnant magnetization of the memory means 3 caused by a prior information is first erased. Then the information field $H_e$ and an appropriate bias field $H_b$ are simultaneously applied to the memory 3 in the easy axial direction thereof. The intensity of the bias field $H_b$ is so selected as not to substantially vary the value of the remnant magnetization M with respect to the original point of the hysteresis curve and as to produce a substantially linear relationship between the information and the remnant magnetization. Thereafter, the auxiliary magnetic field $H_t$ is applied to the memory means 3 in the hard direction thereof. Accordingly, the information is recorded in the memory means 3 in accordance with the longitudinal travelling of the memory means 3. The information is read out by utilizing the rotation of the remnant magnetization in the case of application of an appropriate auxiliary magnetic field $H_t$ as mentioned above with reference to Equation 1. This is the generic operational principle of the invention.

Figure 9:
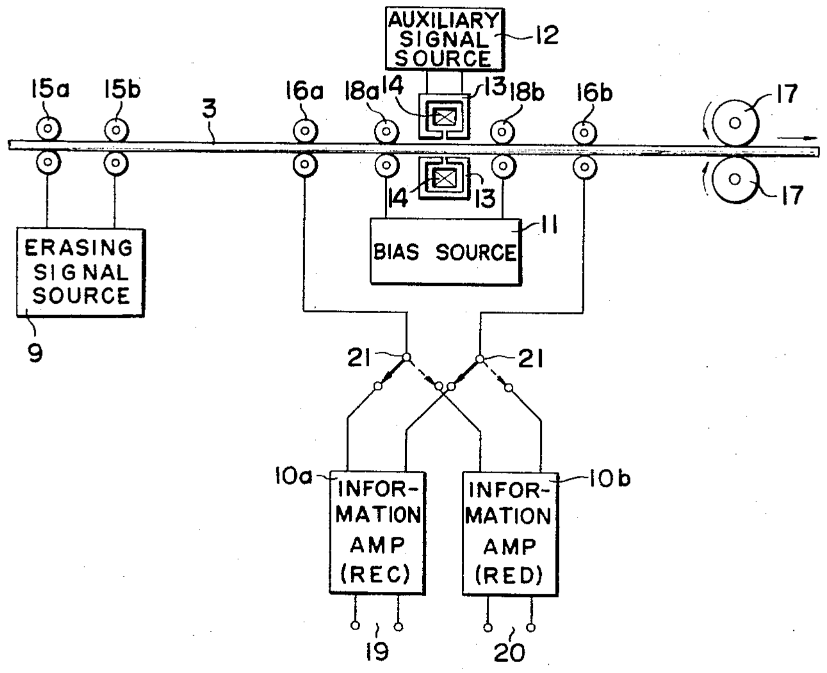
FIGS. 9 and 10 are connection diagrams for showing embodiments of the invention.

The principle can be reduced to practice by the preferred embodiments of the invention described below. FIG. 9 shows a block diagram of the recording system of the invention in which a memory means 3 having a transverse easy axis is employed. The erasing magnetic field $H_d$ or $H_{ac}$ is applied to the memory means 3 through a pair of contact terminals 15*a* and 15*b*. The information signal applied through terminals 19 is passed if necessary through an information amplifier 10*a*, a switch 21 and a pair of contact terminals 16*a* and 16*b* and applied to the memory means 3. The bias signal is applied from a bias source 11 to the memory means 3 through a pair of contact terminals 18*a* and 18*b*. The auxiliary magnetic field $H_t$ is applied, through a magnetic head 13 with a coil 14, to the memory means 3, the field $H_t$ being generated by a signal supplied from an auxiliary signal source 12. Rollers 17 are means for moving the memory means 3 in the longitudinal direction designated by an arrow. By this arrangement and composition, the erasing field $H_d$ or $H_{ac}$, the information field $H_e$ and the bias field $H_b$ are applied to the memory means 3 in the easy axial direction thereof (the transverse direction), and the auxiliary field $H_t$ is applied in the hard direction (the longitudinal direction) of the memory means 3. The two kinds of fields intersect in a region with substantially rectangular shape in a very short portion of the memory means 3, the short portion being opposed to a narrow slit of the magnetic head 13. Accordingly, the recording operation as described in above paragraphs (2) through (5) can be performed in the very short portion according to the moving operation of the moving means 17.

Then, read out of the information so recorded is carried out by the application of the auxiliary signal from the source 12 under the operation of the moving means. A regenerated output signal is derived through the terminals 16*a* and 16*b* and passed through the switch 21 and an information amplifier 10*b* connected to output terminals 20. The information amplifier 10*a* and 10*b* can be made commonly.

Figure 10:
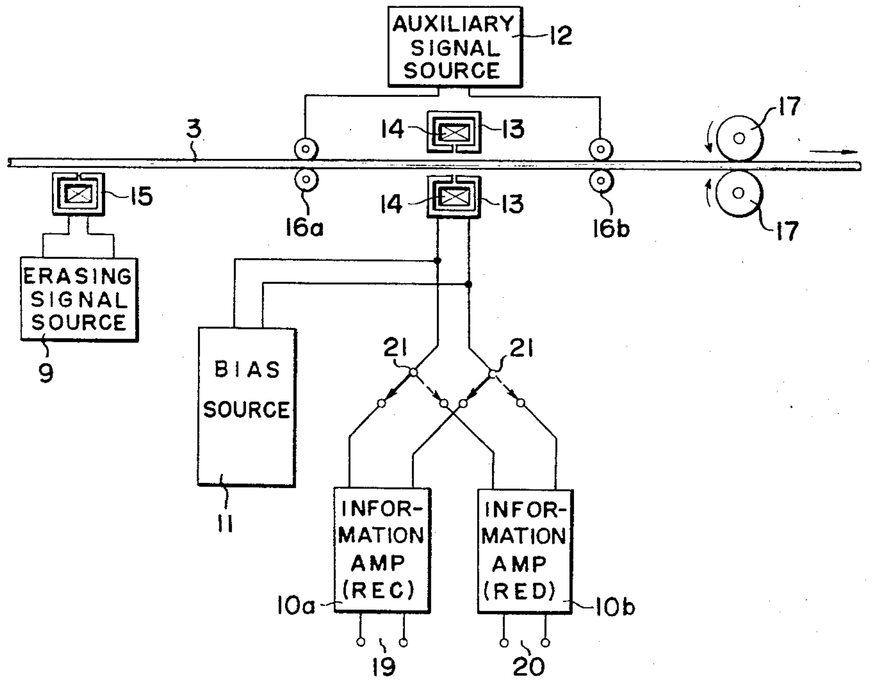

FIG. 10 shows a block diagram of a recording system of the invention in which a memory means 3 having a longitudinal easy axis is employed. The erasing magnetic field $H_d$ or $H_{ac}$ is applied to the memory means 3 through a magnetic head 15. The information field $H_e$ and the bias field $H_b$ are applied through a magnetic head 13. The auxiliary magnetic field $H_t$ is applied through a pair of contact terminals 16*a* and 16*b*. Accordingly, the erasing field $H_d$ or $H_{ac}$, the information field $H_e$ and the bias field $H_b$ are applied in the easy axial direction (longitudinal direction) of the memory means 3, and the auxiliary field $H_t$ is applied in the hard direction (transverse direction) of the memory means 3. The recording operation in this case is easily understood from the operational principle, and, therefore, detail description is herein omitted.

Figures 11A, 11B:
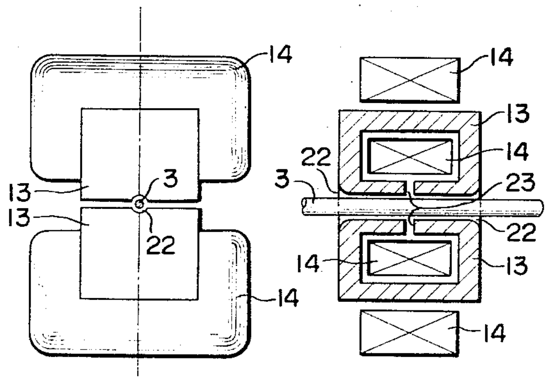

FIG. 11(A) shows an elevation view of the magnetic head 13 viewed in the travelling direction of the memory means. The magnetic head 14 has a hole 22 for passing the memory means 3. This magnetic head 14 may be divided into two parts in order to permit handling of the memory means 3 without the trouble of passing it through the head. FIG. 11(B) shows a sectional view of the magnetic head taken along the dot-and-dash line in FIG. 11(A). A slit 23 of the magnetic head 13 surrounds substantially the entire periphery of the memory means 3 over a very short portion thereof.

Figure 12B:
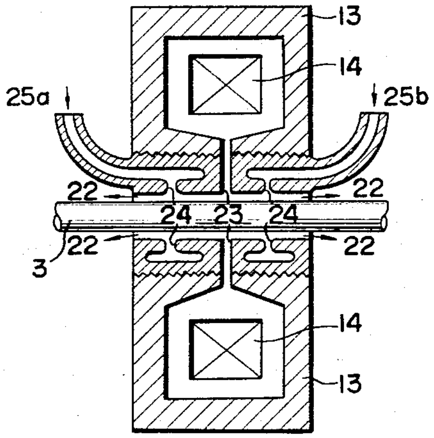
Figure 12A:
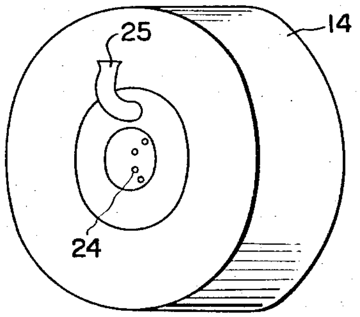

FIG. 12(A) is a perspective view of another type of the magnetic head 13 in which a fluid material, such as air or a volatile liquid, is forced through an inlet 25 to form a thin film between the memory means 3 and the magnetic head 13. FIG. 12(B) shows a longitudinal sectional view of the magnetic head 13 taken along the dot-and-dash line in FIG. 12(A). The fluid material is passed through the inlets 25*a* and 25*b* and holes 24 and flows out from the hole 22. This type of magnetic head 13 is employed in order to avoid defacement of the surface of the memory means 3 or the magnetic head.

In the case of application or derivation, through terminals 28, of an alternating signal to or from the memory means 13, a pair of terminals (26*a* and 26*b*) or (27*a* and 27*b*) shown in FIGS. 13(A) and 13(B), which are capacitively coupled to the memory means 3 can be employed instead of said pair of contact terminals (15*a* and 15*b*), (16*a* and 16*b*) or (18*a* and 18*b*). In this case capacitive coupling is attained by stray capacitance between a terminal and the memory means 3.

FIG. 14 shows a sectional view of another means 31 for moving the memory means 3. The memory means 3 passed through a hole or bore 29 is propelled by compressed travelling air which is supplied into inlets 30*a* and 30*b* and passed out through the hole outlet end 29*b*.

For the other parts of the recording system, the same parts of a conventional recording system can be used. For example, a reel means, not shown, for winding therein the memory means 3 is of course employed. Mechanism for moving the memory means 3 at a substantially constant speed in a conventional recording system can also be employed. Detailed description with respect to other means is herein omitted.

As described above, the recording system of this invention has many advantages, such as substantially uniform regeneration characteristic up to relatively high frequency and recording operation with very weak information signal to the magnetic memory means, which has a relatively large coercive force.

What I claim is:

1. A magnetic recording system, comprising memory means consisting of a slender conductor coated with ferromagnetic thin film having an anisotropy, erasing means for erasing the effect of remnant magnetization of the slender memory means before recording thereon, information applying means for magnetizing the memory means in the direction of the anisotropy in accordance with the magnitude of an information signal which is less than the magnitude to generate a magnetomotive force equal to the coercive force of the magnetic material, exciting means for auxiliarily magnetizing the slender memory means in the direction orthogonal to the direction of the anisotropy thereby reducing the magnitude of the hysteresis loop of the ferromagnetic thin film viewed from the direction of the anisotropy, the information applying means comprising means further applying a bias magnetic field to the slender memory means in the direction of the anisotropy, said bias magnetic field being of a magnitude not to substantially vary the remnant magnetization of the magnetic material with respect to an original point of the hysteresis curve, magnetizations caused by the information applying means and the exciting means being caused to intersect at substantially right angles at an extremely short portion of the slender memory means, and means for moving the slender conductor along the longitudinal direction thereof at a substantially constant traveling speed, thereby shifting said intersecting magnetizations along the longitudinal direction of the slender memory means, whereby the information signal is memorized in the remnant state of the ferromagnetic thin film in accordance with said shifting of the intersecting magnetizations, and then the information signal so memorized is non-destructively derived from the slender memory means when the exciting means applies an appropriate magnetic field to the slender memory means in the operation of said means for moving the slender memory means.

2. A system according to claim 1, in which the slender conductor is made of a spring wire.

3. A system according to claim 1, in which said ferromagnetic thin film has a non-magnetostriction characteristic.

4. A magnetic recording system, comprising memory means consisting of a slender conductor coated with ferromagnetic thin film having an anisotropy which is established in the longitudinal direction of the slender conductor, erasing means for erasing the effect of remnant magnetization of the slender memory means before recording thereon, information applying means for magnetizing the memory means in the direction of the anisotropy in accordance with the magnitude of an information signal which is less than the magnitude to generate a magnetomotive force equal to the coercive force of the magnetic material, exciting means for auxiliarily magnetizing the slender memory means in the transverse direction thereof, thereby reducing the magnitude of the coercive force of the ferromagnetic thin film viewed from the longitudinal direction thereof, the information applying means further applying a bias signal to the slender memory means in the longitudinal direction thereof, said bias magnetic field being of a magnitude not to substantially vary the remnant magnetization of the magnetic material with respect to an original point of the hysteresis curve, magnetizations caused by the information applying means and the exciting means being caused to intersect at substantially right angles at an extremely short portion of the slender memory means, and means for moving the slender conductor along the longitudinal direction thereof at a substantially constant speed, thereby shifting said intersecting magnetizations along the longitudinal direction of the slender memory means, whereby the information signal is memorized in the remnant state of the ferromagnetic thin film in accordance with said shifting of the intersecting magnetizations, and then the information signal so memorized is non-destructively derived from the slender memory means when the exciting means and means for moving the slender memory means are operated.

5. A system according to claim 4, in which the exciting means is a pair of terminals capacitively coupled to the slender conductor, an exciting signal for generating the auxiliary magnetization being applied to said pair of terminals.

6. A system according to claim 4, in which the exciting means is a pair of terminals directly contacting the slender memory means, an exciting signal for generating the auxiliary magnetization being applied to said pair of terminals.

7. A system according to claim 4, in which the information applying means is a magnetic head which is closely disposed to the slender memory means with a thin film of a fluid substance interposed therebetween.

8. A system according to claim 7, in which the fluid substance is air.

9. A system according to claim 7, in which the fluid substance is a volatile liquid.

10. A magnetic recording system, comprising memory means consisting of a slender conductor coated with ferromagnetic thin film having an anisotropy which is established in the transverse direction of the slender conductor, erasing means for erasing the effect of remnant magnetization of the slender memory means before recording thereon, information applying means for magnetizing the memory means in the direction of the anisotropy in accordance with the magnitude of an information signal which is less than the magnitude to generate a magnetomotive force equal to the coercive force of the magnetic material, exciting means for auxiliarily magnetizing the slender memory means in the longitudinal direction thereof, thereby reducing the magnitude of the coercive force of the ferromagnetic thin film viewed from the direction of the anisotropy, the information applying means further applying a bias signal to the slender memory means in the direction of the anisotropy said bias magnetic field being of a magnitude not to substantially vary the remnant magnetization of the magnetic material with respect to an original point of the hysteresis curve, magnetizations caused by the information applying means and the exciting means being caused to intersect at substantially right angles at an extremely short portion of the slender memory means, and means for moving the slender conductor along the longitudinal direction thereof at a substantially constant traveling speed, thereby shifting said intersecting magnetizations along the longitudinal direction of the slender memory means, whereby the information signal is memorized in the remnant state of the ferromagnetic thin film in accordance with said shifting of the intersecting magnetizations, and then the information signal so memorized is non-destructively derived from the slender memory means when the exciting means and means for moving the slender memory means are operated.

11. A system according to claim 10, in which the slender conductor is made of a spring wire.

12. A system according to claim 10, in which said ferromagnetic thin film has a non-magnetostriction characteristic.

13. A system according to claim 10, in which the information applying means is a pair of terminals capacitively coupled to the slender conductor, both the information signal and the bias signal being applied to said pair of terminals.

14. A system according to claim 10 in which the information applying means is a pair of terminals directly contacting the slender memory means, both the information signal and the bias signal being applied to said pair of terminals.

15. A system according to claim 10, in which the exciting means is a magnetic head which is closely disposed to the slender memory means with a thin film of a fluid substance interposed therebetween, and the auxiliary exciting signal being applied to the magnetic head.

16. A system according to claim 15, in which the fluid substance is air.

17. A system according to claim 15, in which the fluid substance is a volatile liquid.

18. A magnetic recording system, comprising memory means consisting of a slender conductor coated with ferromagnetic thin film having an anisotropy, erasing means for applying to the memory means a direct-current magnetic field sufficient to saturate the memory means in the direction of the anisotropy, thereby erasing the effect of remnant magnetization of the memory means before recording thereon, information applying means for magnetizing the memory means in the direction of the anisotropy in accordance with the magnitude of an information signal which is less than the magnitude to generate a magnetomotive force equal to the coercive force of the magnetic thin film, exciting means for auxiliarily magnetizing the slender memory means in the direction orthogonal to the direction of the anisotropy, thereby reducing the magnitude of the hysteresis loop of the ferromagnetic thin film viewed from the direction of the anisotropy, the information applying means comprising means applying a bias magnetic field to the slender memory means in the direction of the anisotropy, said bias magnetic field being substantially equal to the coercive force of the reduced hysteresis loop, magnetizations caused by the information applying means and the exciting means being caused to intersect at substantially right angles at an extremely short portion of the slender memory means, and means for moving the slender conductor along the longitudinal direction thereof at a substantially constant traveling speed, thereby shifting said intersecting magnetizations along the longitudinal direction of the slender memory means, whereby the information signal is memorized in the remnant state of the ferromagnetic thin film in accordance with said shifting of the intersecting magnetizations, and then the information signal so memorized is non-destructively derived from the slender memory means when the exciting means applies an appropriate magnetic field to the slender memory means in the operation of said means for moving the slender memory means.

19. A system as claimed in claim 18, in which a small alternating field is superimposed on the bias field.

20. A magnetic recording system, comprising memory means consisting of a slender conductor coated with ferromagnetic thin film having an anisotropy, erasing means for applying to the memory means an alternating magnetic field sufficient to magnetize the slender memory means along the major hysteresis loop, information applying means for magnetizing the memory means in the direction of the anisotropy in accordance with the magnitude of an information signal which is less than the magnitude to generate a magnetomotive force equal to the coercive force of the magnetic thin film, exciting means for auxiliarily magnetizing the slender memory means in the direction orthogonal to the direction of the anisotropy, thereby reducing the magnitude of the hysteresis loop of the ferromagnetic thin film viewed from the direction of the anisotropy, the information applying means comprising means applying a bias magnetic field to the slender memory means in the direction of the anisotropy, said bias magnetic field being substantially equal to the coercive force of the reduced hysteresis loop, magnetizations caused by the information applying means and the exciting means being caused to intersect at substantially right angles at an extremely short portion of the slender memory means, and means for moving the slender conductor along the longitudinal direction thereof at a substantially constant traveling speed, thereby shifting said intersecting magnetizations along the longitudinal direction of the slender memory means, whereby the information signal is memorized in the remnant state of the ferromagnetic thin film in accordance with said shifting of the intersecting magnetizations, and then the information signal so memorized is non-destructively derived from the slender memory means when the exciting means applies an appropriate magnetic field to the slender memory means in the operation of said means for moving the slender memory means.

21. A magnetic recording system, comprising memory means consisting of a slender conductor coated with ferromagnetic thin film having an anisotropy, erasing means for applying to the memory means an alternating magnetic field sufficient to magnetize the slender memory means along the major hysteresis loop, information applying means for magnetizing the memory means in the direction of the anisotropy in accordance with the magnitude of an information signal which is less than the magnitude to generate a magnetomotive force equal to the coercive force of the magnetic thin film, exciting means for auxiliarily magnetizing the slender memory means in the direction orthogonal to the direction of the anisotropy, thereby reducing the magnitude of the hysteresis loop of the ferromagnetic thin film viewed from the direction of the anisotropy, the information applying means comprising means applying an alternating bias magnetic field to the slender memory means in the direction of the anisotropy, said bias magnetic field being of an intensity substantially greater than that to magnetize the slender memory means along a major loop of the reduced hysteresis curve, magnetizations caused by the information applying means and the exciting means being caused to intersect at substantially right angles at an extremely short portion of the slender memory means, means for moving the slender conductor along the longitudinal direction thereof at a substantially constant traveling speed, thereby shifting said intersecting magnetizations along the longitudinal direction of the slender memory means, whereby the information signal is memorized in the remnant state of the ferromagnetic thin film in accordance with said shifting of the intersecting magnetizations and then the information signal so memorized is non-destructively derived from the slender memory means when the exciting means applies an appropriate magnetic field to the slender memory means in the operation of said means for moving the slender memory means.

22. A system as claimed in claim 21, in which the means applying said alternating bias magnetic field comprises means effective to cause said bias magnetic field to be substantially equal to zero value.

References Cited

UNITED STATES PATENTS

| | | | |
|---|---|---|---|
| 3,140,471 | 7/1964 | Fuller et al. | 340—174 |
| 3,270,326 | 8/1966 | Schwartz et al. | 340—174 |
| 3,275,839 | 9/1966 | Bartnik | 340—174 |
| 3,278,914 | 11/1966 | Rashleigh et al. | 340—174 |
| 3,284,785 | 11/1966 | Kornei | 340—174.1 |

BERNARD KONICK, *Primary Examiner.*

V. P. CANNEY, *Assistant Examiner.*